US008421787B2

(12) United States Patent
Ryu

(10) Patent No.: US 8,421,787 B2
(45) Date of Patent: Apr. 16, 2013

(54) CIRCUIT AND METHOD FOR DRIVING LINE REPAIR AMPLIFIER

(75) Inventor: Choong-Sik Ryu, Anyang-si (KR)

(73) Assignee: Dongbu HiTek Co., Ltd., Seoul (KR)

( * ) Notice: Subject to any disclaimer, the term of this patent is extended or adjusted under 35 U.S.C. 154(b) by 784 days.

(21) Appl. No.: 12/644,316

(22) Filed: Dec. 22, 2009

(65) Prior Publication Data

US 2010/0164942 A1 Jul. 1, 2010

(30) Foreign Application Priority Data

Dec. 30, 2008 (KR) ........................ 10-2008-0136571

(51) Int. Cl.
*G06F 3/038* (2006.01)
*G09G 3/36* (2006.01)

(52) U.S. Cl.
USPC .............. 345/209; 345/96; 345/100; 345/214

(58) Field of Classification Search .................... 345/87, 345/96, 100, 204, 209, 211, 214
See application file for complete search history.

(56) References Cited

U.S. PATENT DOCUMENTS

2004/0041826 A1* 3/2004 Nakagawa et al. ........... 345/694
2008/0180427 A1* 7/2008 Nishimura .................... 345/209
2008/0291190 A1* 11/2008 Kim et al. .................... 345/211

* cited by examiner

*Primary Examiner* — Joseph Haley
*Assistant Examiner* — Andrew Sasinowski
(74) *Attorney, Agent, or Firm* — Sherr & Jiang, PLLC

(57) ABSTRACT

A circuit and method for driving a line repair amplifier includes a line repair amplifier which can be driven by using a single side input which can use an amplifier which drives a gray high side only and an amplifier which drives a gray low side only separately in a liquid crystal display device which uses a line repair amplifier.

20 Claims, 3 Drawing Sheets

CIRCUIT AND METHOD FOR DRIVING LINE REPAIR AMPLIFIER

The present application claims priority under 35 U.S.C. §119 to Korean Patent Application No. 10-2008-0136571 (filed on Dec. 30, 2008), which is hereby incorporated by reference in its entirety.

BACKGROUND

Generally, since the liquid crystal display device is designed line by line, if a defective pixel of the liquid crystal display device is formed at one spot, there can be cases when an entire line can be turned down and opening of a data line can take place in the liquid crystal display device failing transmission of all of signals to the liquid crystal display device. In such cases, the line repair amplifier, applying the signal to an opposite side of the defective pixel, contributes to significant increase in a yield of the liquid crystal display device, highly.

Figure 1:
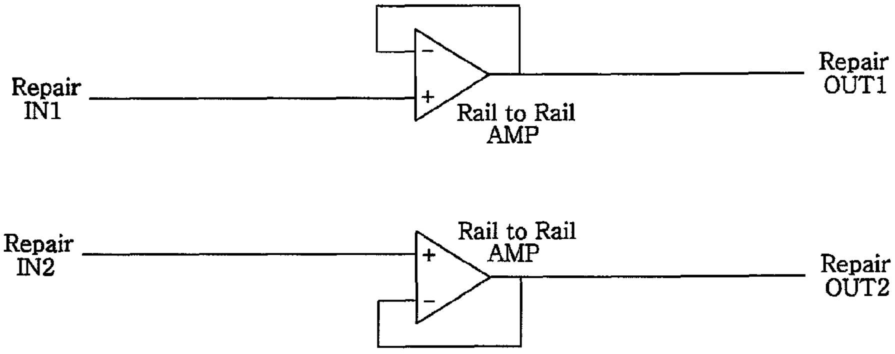

FIG. 1 illustrates a circuit diagram of a line repair amplifier.

As illustrated in FIG. 1, since the line repair amplifier uses an amplifier that can drive both a gray high side and a gray low side with reference to an intermediate voltage of the liquid crystal display device called as rail-to-rail at a time, the line repair amplifier can forward the gray high or gray low of each of odd numbered lines/even numbered lines during driving. Such a liquid crystal display device operative is provided with the line repair amplifier built in a driving circuit for enabling line repair of the liquid crystal display device. However, in accordance with a driving system, since the line repair amplifier is used only in the rail-to-rail type, in a case it is intended to use the line repair amplifier as other amplifier of other service (e.g., a gamma amplifier), the line repair amplifier can not perform the service of the gamma amplifier as the gamma amplifier is used in a single side input structure.

SUMMARY

Embodiments are related to a liquid crystal display device, and more particularly, to a circuit and method for driving a line repair amplifier which is suitable for embodying a line repair amplifier that uses a single side input in a liquid crystal display device.

Embodiments are related to a circuit and method for driving a line repair amplifier.

Embodiments are related to a circuit and method for driving a line repair amplifier which enables to use an amplifier which drives a gray high side only and an amplifier which drives a gray low side only separately in a liquid crystal display device which uses a line repair amplifier.

Embodiments are related to a circuit and method for driving a line repair amplifier which enables to drive by using, not a rail-to-rail system, but a single side input switching system, in a liquid crystal display device which uses a line repair amplifier.

Embodiments are related to a circuit and method for driving a line repair amplifier in which a line repair amplifier is embodied by using a single side input for using the line repair amplifier as a gamma amplifier.

In accordance with embodiments, a circuit for driving a line repair amplifier can include at least one of the following: a POL signal forwarding unit for forwarding a POL signal, an odd number/even number switching control unit for controlling switching such that the POL signal is forwarded to an odd numbered repair line or an even numbered repair line, a repair input switching unit for controlling switching of the odd numbered and the even numbered repair input lines under the switching control of the odd number/even number switching control unit, a repair output switching unit for controlling switching of the odd numbered and the even numbered repair output lines under the switching control of the odd number/even number switching control unit, a gray high driving amplifier connected between the repair input switching unit and the repair output switching unit for forwarding a gray high signal, and a gray low driving amplifier connected between the repair input switching unit and the repair output switching unit for forwarding a gray low signal.

In accordance with embodiments, a method for driving a line repair amplifier can include at least one the following: forwarding a switching control signal to an odd numbered or an even numbered repair line upon receiving a high POL signal or a low POL signal, switching such that an odd numbered repair input line is connected to a gray high driving amplifier which forwards a gray high signal in response to the switching control signal, switching such that an even numbered repair input line is connected to a gray low driving amplifier which forwards a gray low signal in response to the switching control signal, switching such that the gray high signal received in response to the switching control signal is forwarded to an odd numbered repair output line, and switching such that the gray low signal received in response to the switching control signal is forwarded to an even numbered repair output line.

In accordance with embodiments, method for driving a line repair amplifier can include at least one of the following: forwarding a switching control signal to an odd numbered or an even numbered repair line upon receiving a high POL signal or a low POL signal, switching such that an odd numbered repair input line is connected to a gray low driving amplifier which forwards a gray low signal in response to the switching control signal, switching such that an even numbered repair input line is connected to a gray high driving amplifier which forwards a gray high signal in response to the switching control signal, switching such that the gray low signal received in response to the switching control signal is forwarded to an odd numbered repair output line, and switching such that the gray high signal received in response to the switching control signal is forwarded to an even numbered repair output line.

DRAWINGS

FIG. 1 illustrates a circuit diagram of a line repair amplifier.

Figure 2:
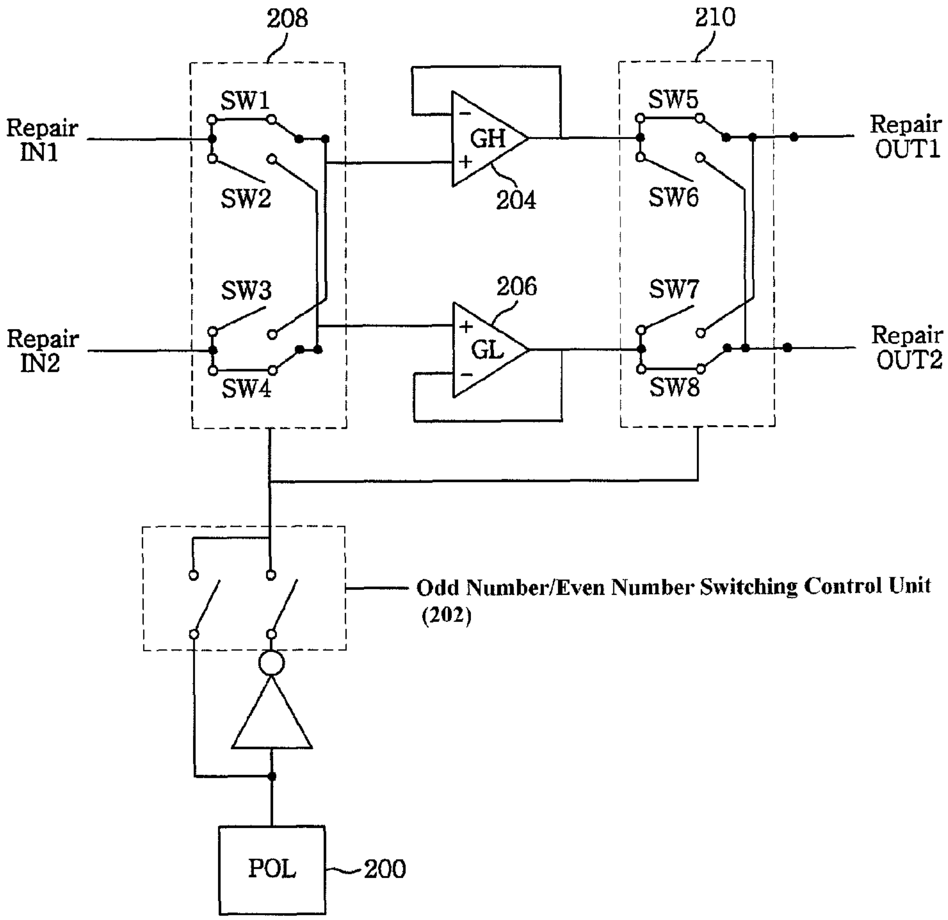
Figure 3:
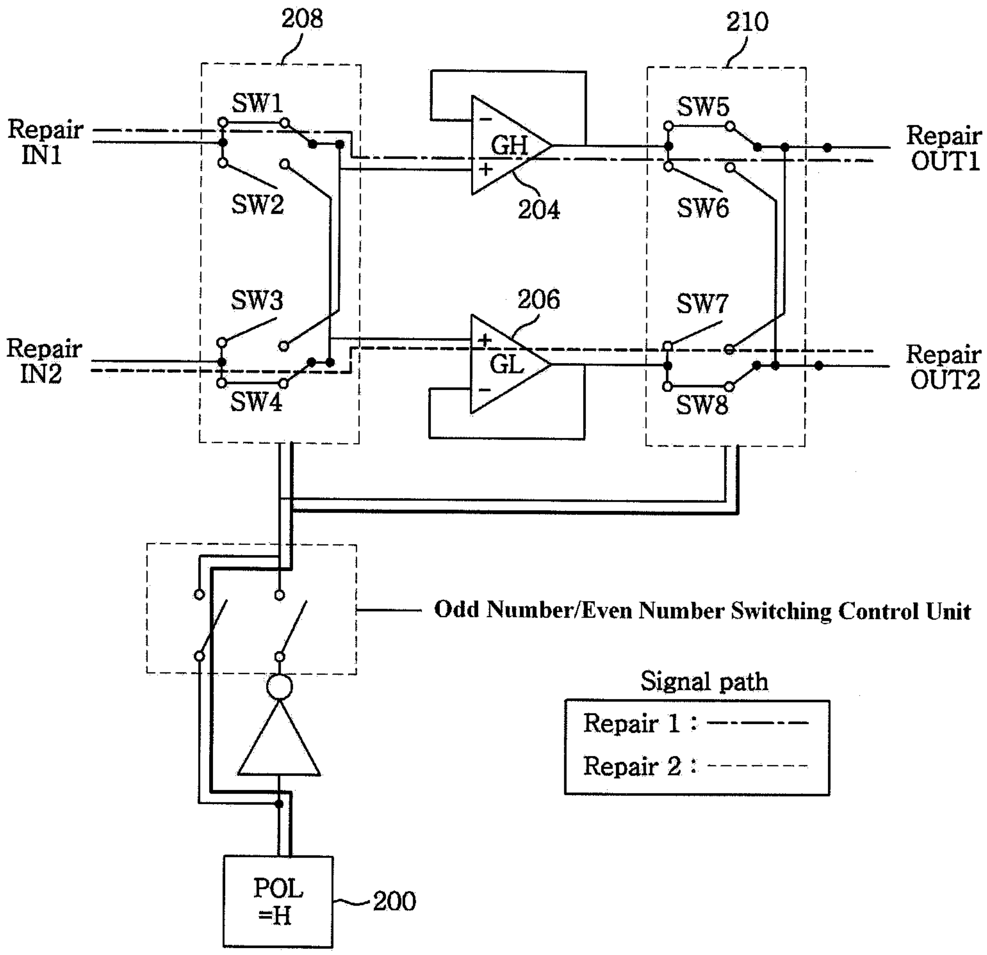
Figure 4:
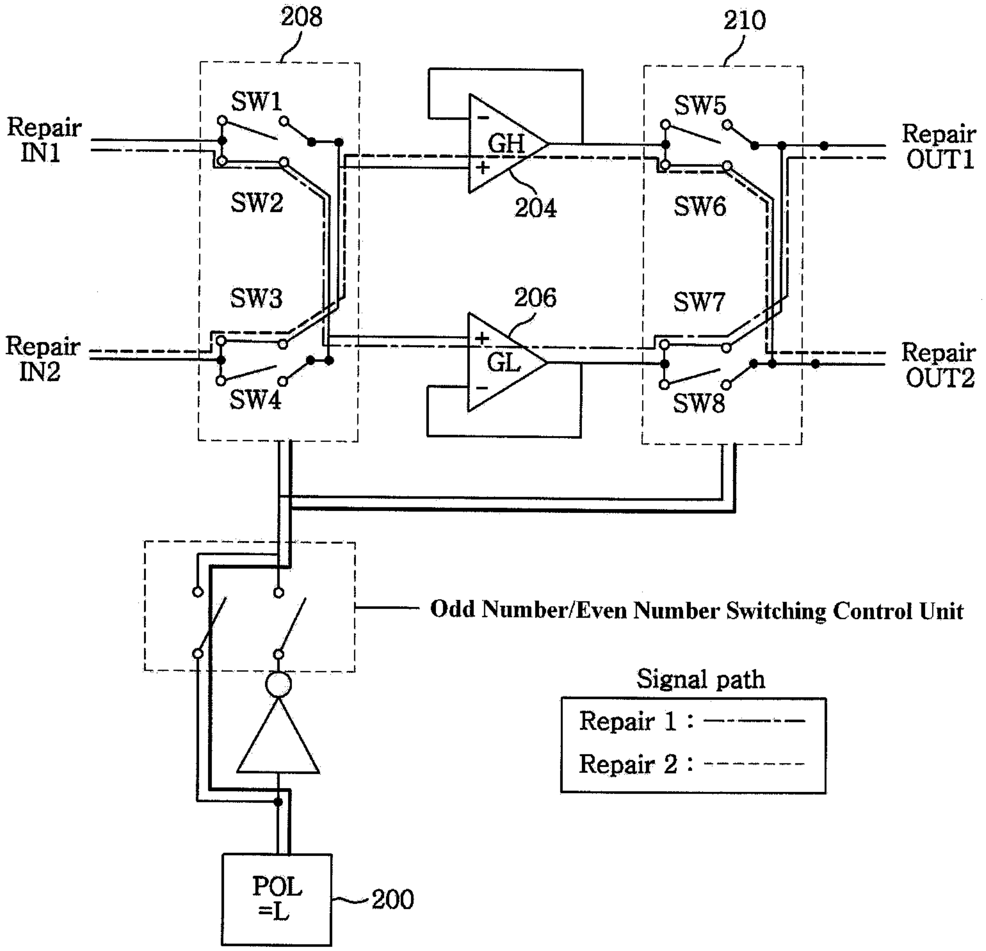

Example FIGS. 2 to 4 illustrate a circuit diagram of a circuit for driving a line repair amplifier, a signal flow in a line repair amplifier when a POL signal is high, and a signal flow in a line repair amplifier when a POL signal is low, in accordance with embodiments.

DESCRIPTION

Reference will now be made in detail to embodiments, examples of which are illustrated in the accompanying drawings. Wherever possible, the same reference numbers will be used throughout the drawings to refer to the same or like parts.

Circuit and method for driving a line repair amplifier of embodiments include a line repair amplifier which enables to use, not a rail-to-rail system that is used generally, but a single side input which enables to use an amplifier which drives a gray high side only and an amplifier which drives a gray low side only separately in a liquid crystal display device which uses a line repair amplifier. Meaning, though a liquid crystal display device has a line repair amplifier which can repair lines of the liquid crystal display device built in a driving circuit for increasing a yield of the liquid crystal display device, the line repair amplifier can be built in every driving circuit or a gamma amplifier can be used for correcting a gamma value of the driving circuit.

However, in accordance with a driving system, though the line repair amplifier is required to use the rail-to-rail system only, the gamma amplifier, having a fixed filed of use, uses the single input structure, rather than the rail-to-rail system. Accordingly, by moving away from the rail-to-rail structure of the line repair amplifier and embodying the line repair amplifier with the single side input structure, the line repair amplifier can be made to use as the gamma amplifier in the driving circuit easily whenever required.

Example FIG. 2 illustrates a circuit diagram of a circuit for driving a line repair amplifier in accordance with embodiments.

As illustrated in example FIG. 2, the circuit for driving a line repair amplifier includes POL signal forwarding unit 200, odd number/even number switching control unit 202, gray high (GH) driving amplifier 204, gray low (GL) driving amplifier 206, repair input switching unit 208, and repair output switching unit 210. Repair input 1 repairs an odd numbered line and repair input 2 repairs an even numbered line. Accordingly, POL signal forwarding unit 200 forwards a high or low POL signal. Meaning, POL signal forwarding unit 200 forwards a positive (+) signal and a negative (−) signal.

Odd number/even number switching control unit 202 provides a switching control command to repair input switching unit 208 and repair output switching unit 210 such that input/output of an odd numbered or even numbered repair line is connected to preset gray high driving amplifier 204, and gray low driving amplifier 206 in response to the high or low POL signal from POL signal forwarding unit 200. Accordingly, repair input switching unit 208 switches such that odd and even numbered repair input lines are connected to gray high driving amplifier 204, or gray low driving amplifier 206 under a switching control command from odd number/even number switching control unit 202.

Repair output switching unit 210 performs switching such that a signal from gray high driving amplifier 204, or gray low driving amplifier 206 is connected and forwarded to the odd numbered or even numbered repair output line under a switching control command from odd number/even number switching control unit 202.

In the driving system of a driving circuit of the liquid crystal display device, a direction of the single side input is changed for each line in forwarding a final output. Accordingly, after odd number/even number switching control unit 202 selects whether an odd numbered output line is repaired or an even numbered output line is repaired, the same is controlled by means of the POL signal.

The driving system of the line repair amplifier driving circuit of the single side input structure will be described.

Example FIG. 3 illustrates a circuit diagram showing a signal flow in the line repair amplifier when the POL signal is high in accordance with embodiments.

As illustrated in example FIG. 3, when the POL signal from POL signal forwarding unit 200 is high, a gray high is forwarded through the odd numbered repair output line. Odd number/even number switching control unit 202 forwards the switching control command to repair input switching unit 208 and repair output switching unit 210, such that the odd numbered repair line can be connected to gray high driving amplifier 204 and the even numbered repair line can be connected to gray low driving amplifier 206. Repair input switching unit 208 then connects switch 1 to switch 4 to make the odd numbered repair line to be connected to gray high driving amplifier 204 and the even numbered repair line to be connected to gray low driving amplifier 206. Repair output switching unit 210 connects switch 5 to switch 8 to make the gray high signal to be transmitted from gray high driving amplifier 204 to the odd numbered repair output line, and the gray low signal to be transmitted from gray low driving amplifier 206 to the even numbered repair output line.

Example FIG. 4 illustrates a circuit diagram showing a signal flow in the line repair amplifier when a POL signal is low in accordance with embodiments.

As illustrated in example FIG. 4, when the POL signal from POL signal forwarding unit 200 is low, the gray high is forwarded through the odd numbered repair output line. Odd number/even number switching control unit 202 forwards the switching control command to repair input switching unit 208 and repair output switching unit 210, such that the odd numbered repair line can be connected to gray low driving amplifier 206 and the even numbered repair line can be connected to gray high driving amplifier 204. Repair input switching unit 208 connects switch 2 to switch 3 to make the odd numbered repair line to be connected to gray low driving amplifier 206 and the even numbered repair line to be connected to gray high driving amplifier 204. Repair output switching unit 210 connects switch 6 to switch 7 to make the gray high signal to be transmitted from gray high driving amplifier 204 to the even numbered repair output line, and the gray low signal to be transmitted from gray low driving amplifier 206 to the odd numbered repair output line.

Accordingly, the gamma amplifier, designed to compensate a gamma voltage by using gray high driving amplifier 204 and gray low driving amplifier 206, can be simply operated as the repair amplifier. Meaning, either the repair amplifier can be built in every driving circuit, or the gamma amplifier can be used for correcting a gamma value of the driving circuit. Since the gamma amplifier has a fixed field of use, the single side input structure is used more than the rail-to-rail system. Therefore, in a case the amplifier of the driving circuit is used as the gamma amplifier through the single input structure, the amplifier of the driving circuit can be easily used as the repair amplifier whenever required.

As described, the circuit and method for driving a line repair amplifier of embodiments include a line repair amplifier which can be driven by using, not a rail-to-rail system as generally used, but single side input which can use an amplifier which drives a gray high side only and an amplifier which drives a gray low side only separately in a liquid crystal display device which uses a line repair amplifier.

Advantages of representative one of disclosed inventions of embodiments will be described, briefly. The circuit and method for driving a line repair amplifier of embodiments permits use of, not a rail-to-rail system, but a single side input system, at the time of designing the line repair amplifier used for enhancing a yield of the liquid crystal display device, and the gamma amplifier driven with the repair amplifier.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A apparatus comprising:

a POL signal forwarding unit configured to forward a POL signal;

an odd number/even number switching control unit configured to control switching such that the POL signal is forwarded to one of an odd numbered repair line and an even numbered repair line;

a repair input switching unit configured to control switching of the odd numbered and the even numbered repair input lines under the switching control of the odd number/even number switching control unit;

a repair output switching unit configured to control switching of the odd numbered and the even numbered repair output lines under the switching control of the odd number/even number switching control unit;

a gray high driving amplifier connected between the repair input switching unit and the repair output switching unit and configured to forward a gray high signal; and a gray low driving amplifier connected between the repair input switching unit and the repair output switching unit configured to forward a gray low signal.

2. The apparatus of claim 1, wherein, if the odd number/even number switching control unit requests odd number switching control, the repair input switching unit switches such that the odd numbered line repair input is connected to one of the gray high driving amplifier and the gray low driving amplifier.

3. The apparatus of claim 1, wherein, if the odd number/even number switching control unit requests even number switching control, the repair input switching unit switches such that the even numbered line repair input is connected to one of the gray high driving amplifier and the gray low driving amplifier.

4. The apparatus of claim 1, wherein, if the odd number/even number switching control unit requests odd number switching control, the repair output switching unit switches such that a signal from one of the gray high driving amplifier and the gray low driving amplifier is forwarded to the odd numbered line repair.

5. The apparatus of claim 1, wherein, if the odd number/even number switching control unit requests odd number switching control, the repair output switching unit switches such that a signal from one of the gray high driving amplifier or the gray low driving amplifier is forwarded to the even numbered line repair.

6. The apparatus of claim 1, used as a gamma amplifier.

7. The apparatus of claim 1, wherein the POL signal forwarding unit forwards a positive (+) high POL signal.

8. The apparatus of claim 7, wherein the POL signal forwarding unit forwards a negative (−) low POL signal.

9. The apparatus of claim 1, wherein the apparatus comprises a circuit for driving a line repair amplifier.

10. The apparatus of claim 1, wherein the odd number/even number switching control unit provides a switching control command to the repair input switching unit and the repair output switching unit.

11. The apparatus of claim 1, wherein the repair input switching unit comprises a plurality of switches.

12. The apparatus of claim 11, wherein the plurality of switches comprises a first switch, a second switch, a third switch and a fourth switch.

13. The apparatus of claim 12, wherein the repair output switching unit comprises a plurality of switches.

14. The apparatus of claim 13, wherein the plurality of switches comprises a fifth switch, a sixth switch, a seventh switch and an eight switch.

15. The apparatus of claim 1, wherein the repair output switching unit comprises a plurality of switches.

16. The apparatus of claim 15, wherein the plurality of switches comprises a fifth switch, a sixth switch, a seventh switch and an eight switch.

17. The apparatus of claim 1, wherein the gray high driving amplifier and the gray low driving amplifier are electrically connected at one end to the repair input switching unit and at another end to the repair output switching unit.

18. A method comprising:

forwarding a switching control signal to one of an odd numbered and an even numbered repair line upon receiving one of a high POL signal and a low POL signal;

switching such that an odd numbered repair input line is connected to a gray high driving amplifier which forwards a gray high signal in response to the switching control signal;

switching such that an even numbered repair input line is connected to a gray low driving amplifier which forwards a gray low signal in response to the switching control signal;

switching such that the gray high signal received in response to the switching control signal is forwarded to an odd numbered repair output line; and then switching such that the gray low signal received in response to the switching control signal is forwarded to an even numbered repair output line.

19. The method of claim 18, wherein the repair input switching unit and the repair output switching unit each comprise a plurality of switches.

20. A method comprising:

forwarding a switching control signal to one of an odd numbered and an even numbered repair line upon receiving one of a high POL signal and a low POL signal;

switching such that an odd numbered repair input line is connected to a gray low driving amplifier which forwards a gray low signal in response to the switching control signal;

switching such that an even numbered repair input line is connected to a gray high driving amplifier which forwards a gray high signal in response to the switching control signal;

switching such that the gray low signal received in response to the switching control signal is forwarded to an odd numbered repair output line; and switching such that the gray high signal received in response to the switching control signal is forwarded to an even numbered repair output line.

* * * * *